United States Patent
Waugh et al.

(10) Patent No.: US 7,783,288 B2
(45) Date of Patent: Aug. 24, 2010

(54) MOBILE NETWORK BASE STATION CONTROLLER COMPRISING A CENTRAL GATEWAY AND A PHYSICALLY SEPARATE REMOTE GATEWAY WHICH COMMUNICATE VIA A REMOTE LINK

(75) Inventors: Guy Waugh, Surrey (GB); Michael Fitzgerald, County Kerry (IE); Christopher Young, Wicklow (IE); Michael Godley, County Kerry (IE); Richard Lord, Cork (IE)

(73) Assignee: Slieve Mish Inventions Limited, Tralee, County Kerry (IE)

( * ) Notice: Subject to any disclaimer, the term of this patent is extended or adjusted under 35 U.S.C. 154(b) by 1019 days.

(21) Appl. No.: 11/364,349

(22) Filed: Mar. 1, 2006

(65) Prior Publication Data
US 2006/0154660 A1    Jul. 13, 2006

Related U.S. Application Data

(63) Continuation of application No. PCT/IE2004/000114, filed on Sep. 2, 2004.

(51) Int. Cl.
*H04W 4/00*       (2009.01)
*H04W 40/00*      (2009.01)
*H04B 7/185*      (2006.01)

(52) U.S. Cl. .................... 455/429; 455/430; 455/431; 455/12.1

(58) Field of Classification Search ......... 455/427–431, 455/12.1, 13.17
See application file for complete search history.

(56) References Cited

U.S. PATENT DOCUMENTS

| | | | |
|---|---|---|---|
| 6,587,687 B1 * | 7/2003 | Wiedeman | 455/428 |
| 6,775,545 B2 * | 8/2004 | Wright et al. | 455/431 |
| 6,856,787 B2 * | 2/2005 | Karabinis | 455/12.1 |
| 6,889,042 B2 * | 5/2005 | Rousseau et al. | 455/431 |
| 2002/0123344 A1 * | 9/2002 | Criqui et al. | 455/431 |
| 2003/0125021 A1 * | 7/2003 | Tell et al. | 455/426 |
| 2004/0132486 A1 * | 7/2004 | Halonen et al. | 455/552.1 |

FOREIGN PATENT DOCUMENTS

| | | |
|---|---|---|
| EP | 1096699 A2 | 5/2001 |
| WO | WO00/76087 | 12/2000 |
| WO | WO02/21725 | 3/2002 |

* cited by examiner

*Primary Examiner*—Tilahun Gesesse
(74) *Attorney, Agent, or Firm*—Jacobson Holman PLLC

(57) ABSTRACT

A remote mobile network part (2, 11, 12) may be on an aircraft, a ship, or in a geographically remote location. It comprises a gateway (6) which communicates with a central gateway (9) via a satellite link. The two gateways (6, 9) together are a base station controller (BSC), the satellite link being used for BSC-internal communication. Such communication can be optimised to make best use of the limited bandwidth available on the satellite link.

27 Claims, 3 Drawing Sheets

MOBILE NETWORK BASE STATION CONTROLLER COMPRISING A CENTRAL GATEWAY AND A PHYSICALLY SEPARATE REMOTE GATEWAY WHICH COMMUNICATE VIA A REMOTE LINK

This is a CONTINUATION of PCT/IE2004/000114 filed 2 Sep. 2004 and published in English.

INTRODUCTION

1. Field of the Invention

The invention relates to communication involving persons at a remote location such as on a movable vehicle or craft, either air-borne, water-borne, or land-borne, or in a remote geographical location with few telecommunication resources.

2. Prior Art Discussion

It is known to provide a mobile network cell in a craft for use by persons who are travelling. Communication between the cell and a fixed mobile or land-line network uses an existing communication link for the craft. An example is the existing satellite link of an aircraft. However, a problem with this approach is that there is often very limited bandwidth available on this link, and so communication is unreliable and significant compression is required. Such links can introduce a large latency, for example a 5 second delay for a single call set-up packet.

It is also known to provide a mobile network infrastructure in remote locations, communication with the remainder of the network being via a satellite link. However, similar problems to those set out above apply.

The invention is therefore directed towards providing a communication system and method for more effective use of existing links between remote locations and major network infrastructure.

SUMMARY OF INVENTION

According to the invention, there is provided a mobile network base station controller comprising physically separate remote and central gateways, in which the remote gateway communicates with cell equipment for a remote mobile network cell, the central gateway communicates with a mobile network node, and the gateways perform internal base station controller communication using a remote communication link.

In one embodiment, the remote communication link is a satellite link.

In one embodiment, the remote communication link is a craft-to-ground communication link.

In one embodiment, the remote communication link is terrestrial based radio, microwave, cable or optical fibre.

In one embodiment, at least one gateway terminates some signalling received from an external entity to minimise internal traffic on the remote communication link.

In one embodiment, the remote gateway terminates heartbeat signalling from remote network nodes.

In another embodiment, the remote gateway terminates radio measurement signalling.

In one embodiment, the remote gateway terminates link measurement signalling.

In one embodiment, the central gateway terminates link management signalling.

In one embodiment, the central gateway terminates heartbeat signalling from a mobile network node.

In one embodiment, each gateway dynamically chooses an appropriate carrier on the remote link according to nature of the signals to optimise bandwidth usage.

In one embodiment, each gateway dynamically switches between use of data and voice channels of the remote link.

In one embodiment, each gateway dynamically maps external interface data to lower-bandwidth data for transmission on the remote link.

In a further embodiment, the remote gateway extracts a dialled number from multiple messages, and transmits only the dialled number data from said multiple messages.

In one embodiment, the remote gateway adds additional data to the dialled number data, and the central gateway interprets the additional data to generate mobile network signals for the mobile network node.

In one. embodiment, the remote gateway uses an ISDN user-to-user signalling field to transfer the additional data.

In one embodiment, the remote gateway uses DTMF to transmit additional data, and the DTMF is terminated at the central gateway.

In one embodiment, the remote gateway batches location update requests according to the nature of the remote link.

In one embodiment, the remote gateway batches text or multi-media messages according to the nature of the remote link.

In one embodiment, authentication related information exchanged between the central gateway and a network node is batched for transmission to and from the remote gateway which handles authentication of individual mobile subscribers.

In one embodiment, the gateways use compression for at least some internal communication on the remote link.

In one embodiment, each gateway buffers speech packets and combines a plurality of buffered speech packets into a single transmission packet.

In a further embodiment, the transmission packet is an RTP packet.

In one embodiment, the gateways perform transcoding and rate adaptation at the most appropriate gateway according to the nature of the remote link.

In one embodiment, the central gateway comprises an operations and maintenance function for both gateways.

In one embodiment, the remote gateway comprises an operations and maintenance function for itself and the remote mobile network cell.

In one embodiment, the operations and maintenance function downloads updates to the remote gateway.

In one embodiment, the operations and maintenance function uploads fault information, status information and statistics from the remote gateway In one embodiment, the central gateway maintains a database of data pertaining to remote gateways with which it communicates.

In one embodiment, the remote gateway maintains a database of registered subscribers for the remote cell.

In one embodiment, the remote gateway is linked to an entertainment or public announcement system.

In one embodiment, the remote gateway allows calls to be interrupted by the public announcement or entertainment system.

In one embodiment, the remote gateway determines if a locally-initiated call or message is to a person located in its cell, and avoids use of the remote link if this is the case.

In one embodiment, the remote gateway is configurable to handle text message traffic only In one embodiment, the remote gateway rejects outgoing voice and data calls from subscribers registered in the remote mobile network cell when the system is operating in text message only mode.

In one embodiment, the central gateway sends a signal to the HLR of a registered subscriber to divert incoming calls when the system is operating in text message only mode In one embodiment, the central gateway detects Ocean Region changes from a remote gateway logon message and from the full address of the remote craft, builds a full correct dialled number including the Ocean region that will be used to terminate voice calls to each subscriber In a further embodiment, at least one of the gateways automatically generates a response to a network node without using the remote link.

In one embodiment, the gateway automatically generates the response within a timeout period set by the network node to which it is responding.

In one embodiment, he gateway is pre-configured with rules to automatically generate said responses.

In one embodiment, said gateway is the central gateway.

In one embodiment, the central gateway automatically generates a response to an MSC class mark enquiry.

The invention also provides a mobile network cell comprising a base station controller as defined above, and a base station transceiver.

The invention also provides a method of communication between a remote mobile network cell and a central mobile network node, the method comprising a base station transceiver of the remote cell communicating with a remote gateway of a base station controller as defined above in any embodiment, the remote gateway processing signals received from the transceiver and transmitting internal base station controller signals to the central gateway via a remote link.

The invention also provides a mobile station comprising an adapter for switching between a normal mode and an in-craft mode.

In one embodiment, said mobile station uses less output power for the in-craft mode.

In one embodiment, said mobile station automatically restricts operation to an in-craft cell when in the in-craft mode.

In one embodiment, the mobile station accepts over-the-air setting of ring and alert tones to silent mode.

In one embodiment, the adapter has an externally visible indicator indicating mode status.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
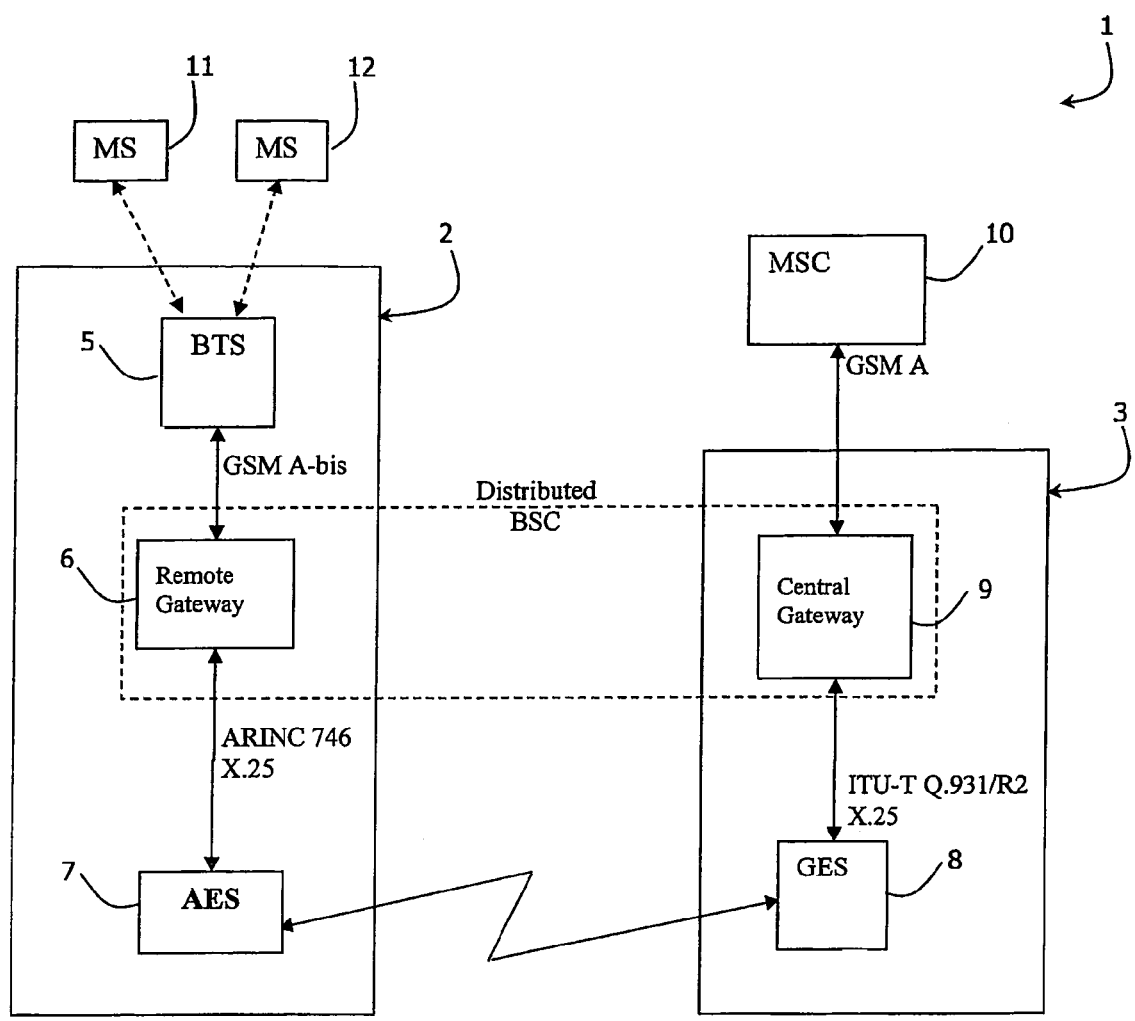
FIG. 1 is a block diagram of a communications system of the invention.

Referring to FIG. 1 a communication system 1 of the invention comprises a remote part 2 and a ground part 3. In this embodiment the remote part is for an aircraft mobile network cell, however, in other embodiments it may be for a geographically remote location such as a remote village, or a ship for example. The remote part 2 comprises a conventional BTS 5 linked by a GSM A-bis link to a gateway 6, called the "remote gateway". The remote gateway 6 uses conventional aircraft satellite communication equipment (AES) 7 and corresponding ground equipment (GES) 8 to communicate with a central gateway 9 on the ground. The gateway 9 in turn communicates with a conventional Mobile Services Switching Centre (MSC) 10. The MSC 10 may already exist as part of an operator's Public Land Mobile Network (PLMN). The MSC 10 is linked with other nodes of its PLMN in conventional manner.

The gateways 6 and 9 are together a BSC for the remote cell of the mobile network (in the aircraft in this case). Thus the BSC is split into two physically separate parts, namely the gateways 6 and 9. The gateways 6 and 9 use the air-to-ground link to communicate, and optimum use is made of the available bandwidth by mapping the standard A and A-Bis protocols onto an optimised internal lightweight protocol between the gateways. More flexibility is possible to minimise traffic internally within the logical BSC than would be possible in the A-bis and A links on either side of the BSC.

The following describes an embodiment in which the network is GSM and the node which is split is a BSC. However, if the network were 3G the "split" note would be an RNC, of if the network were GPRS the split node would be a BSC/PCU.

Conventional mobile stations 11 and 12 communicate with the BTS 5 either using a wired RF connection or a conventional wireless connection.

The fact that the BSC is split between the two gateways means that the central-to-remote communication can be of very low bandwidth and in a protocol tailored for the particular circumstances. The internal traffic is minimised and optimised by the following techniques:

(a) Terminating non-essential received signalling at each gateway 6 and 9, avoiding it being routed on between the gateways, or generating an automatic response without using the link. One example is the central gateway 9 receiving from an MSC a class mark enquiry to determine handset capabilities and voice coding capabilities. The central gateway 9 automatically generates a response without using the link to communicate with the remote gateway 6. The "intelligence" to generate the automatic response arises from configuration settings of the central gateway 9. This response is transmitted within the MSC's timeout period, so that its requirements are met. Another example is at the remote site, in which a BTS and its neighbours' signal strength data is measured and reported by the mobile station for handover decision making by the BSC. Because the remote site is confined in nature and handover may not be necessary, there is no need for relaying such data, and it is simply terminated. The BTS does not expect a response, and there is thus no timeout.

(b) Compression of voice, data, and signalling streams. In one embodiment, RTP speech packets are buffered in the gateways and combined in a single RTP packet to reduce the packet overhead. For example, in GSM, speech packets are sent every 20 ms. If these packets were sent in individual RTP packets the RTP header would be almost the same size as the speech payload. By combining several GSM packets in each RTP packet the payload to packet header ratio can be significantly improved. The delay incurred by this combining process is negligible especially when using Low Earth Orbit satellites. Alternatively, conventional RTP header compression can be used.

(c) Performing GSM transcoding and rate adaptation at the most appropriate point (remote gateway 6 or central gateway 9) depending on the craft-to-ground link used.

(d) Batching of certain non-real time messages such as some location update requests and SMS messages.

(e) Use of a local operations and maintenance (O & M) function on the remote gateway 6 for configuration of the BTS 5.

(f) Optimising the use of protocols such as X.25 by reducing the packet size (in the Aero-H environment this forces the MES to use an R channel instead of a T channel which improves performance)

(g) Terminating certain signalling sequences at the gateway and transmitting the essential data over the satellite link using a different protocol. For example, on A-bis, sending an SMS message involves a first A-bis message containing the text message followed by 2 acknowledge messages. This procedure is executed by the gateway from the BTS point of view, however, the text message is extracted and sent across the satellite as a single X.25 packet pair (packet, packet-acknowledge). In essence, each gateway maps the external data-rich messages to a low-bandwidth set of messages containing only the essential data. A simple example is extraction of the dialled number from several messages on the BTS-BSC Abis interface, and transmitting only the dialled number without the ancillary data on the satellite link. Another example is extraction of essential encryption data from the BTS-BSC A-bis interface and transmitting it in a data channel of the satellite link.

(h) Dynamically choosing satellite channels according to the required bandwidth. For example a single Aero-H channel can be used when one voice channel is required, and if several voice calls are presented at the same time a higher capacity channel (e.g. Swift 64) can be set-up to handle these calls in a more cost effective way.

(i) Dynamically choosing a protocol for the satellite air-to-ground link, the protocol chosen depending on the type of traffic. This feature is described below.

Dynamic Protocol Selection (i)

Most satellite systems are capable of supporting several different physical interfaces and protocols. For example the Inmarsat Aero-H system supports ISDN based switched circuits and X.25 packet data protocol. The ISDN-based circuits and their associated signalling channels are usually used to setup and carry voice calls. The X.25 channel is used to carry bursts of data. The gateway will use X.25 for location updating (registration) and SMS traffic. Once the mobile has been successfully registered on the system it can then make calls which are routed over the ISDN channel.

Setting up these voice calls involves the gateway 6 decoding the Abis messages and mapping the contents of these messages onto the ISDN signalling channel. This ISDN signalling channel does not support the rich set of features that Abis supports and so additional techniques are employed to carry these essential signals across the ISDN channel. The remote gateway 6 uses the following techniques to achieve this:

Adding extra digits to the dialled number, these extra digits are interpreted by the central gateway 9 and used to generate the corresponding signals on the A interface.

Use the ISDN "user-to-user" signalling field to transfer the additional data.

Dynamically switching the circuit between "data" and "voice" call, the call could be set up in data mode and when signalling is complete switched to voice mode.

Use DTMF to transfer additional data, the DTMF is terminated and interpreted by the central gateway 9.

Use a satellite sub-channel to transfer additional data.

Figure 2:
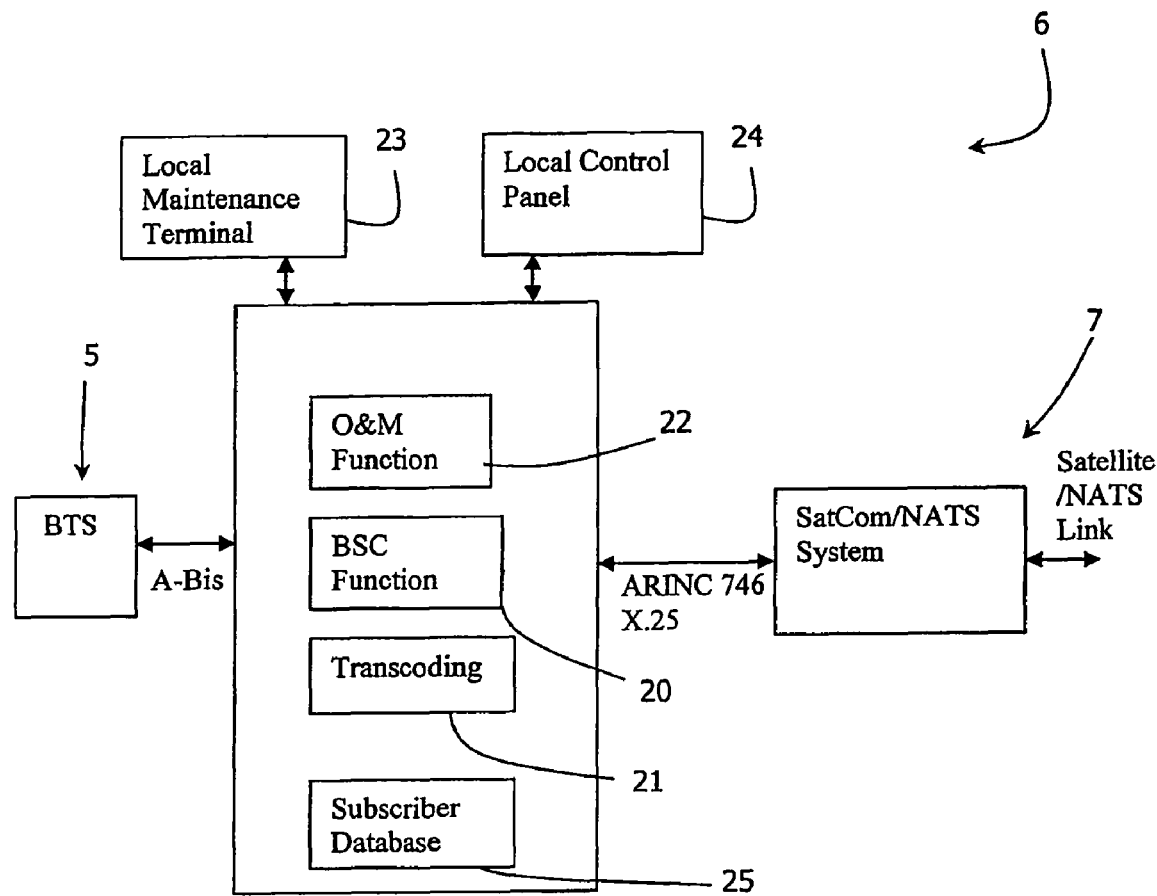
FIGS. 2 and 3 are block diagrams of remote and central gateways of the system.

Referring to FIG. 2 the remote gateway 6 comprises:

20: A BSC function which handles a subset of standard BSC functionality including signalling adaptation and switching.

21: A speech and data transcoding and compression unit which handles speech channel compression, decompression, transcoding and rate adaption.

22: An O&M function which handles O&M operations for the BTS 5 and the remote gateway 6 itself.

23: A local maintenance terminal

24: A Local Control Panel (LCP)

25: A Subscriber Database

Figure 3:
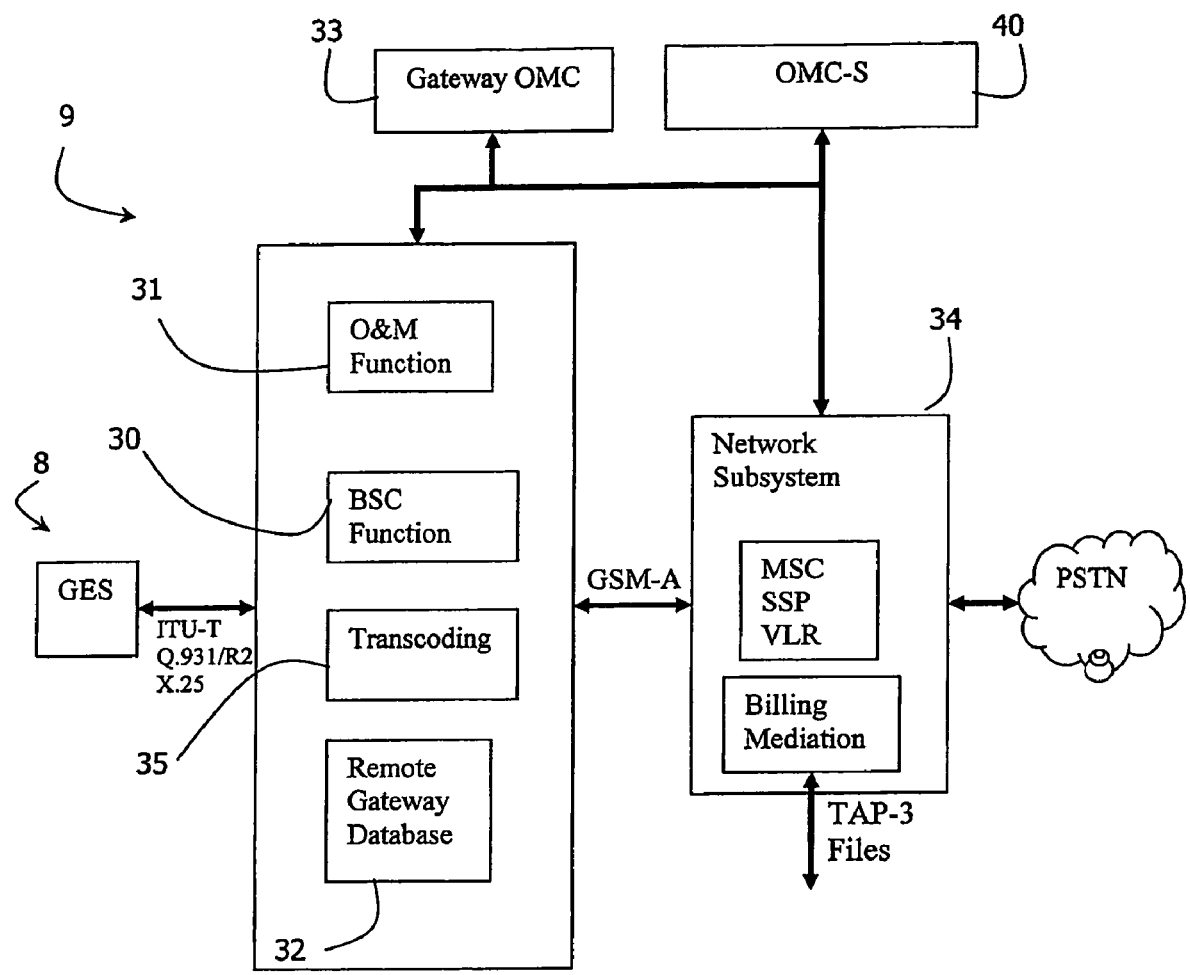

Referring to FIG. 3 the central gateway 9 comprises:

30: A BSC function which handles a subset of standard BSC functionality including signalling adaptation and switching.

31: An O&M function handles O&M operations for the gateway 9, associated mobile gateways 6 and BTSs.

32: A remote gateway 6 database which is used by the gateway 9 to determine the location of BTSs in terms of communications.

33: An O&M application 33 specifically dedicated to the management of the central gateway, remote gateways and BTSs.

34: A local maintenance terminal (LMT).

35: A speech and data transcoding and compression unit which handles speech channel compression, decompression, transcoding and rate adaption.

As the satellite links used between aircraft and ground station are typically low bandwidth and high cost, all unnecessary signalling is discarded or terminated by the gateways 6 and 9. For example, handovers may not be necessary in some applications, so measurement reports that are sent from the BTS 5 to the remote gateway 6 could be ignored. Other signalling messages such as heartbeat and certain O&M messages may be terminated and handled by the gateway 6 or 9 in the same way that the BSC would handle these messages.

As for speech and signalling it is necessary to minimise O&M traffic on the satellite link. The system can be configured so that only urgent fault information (alarms) will be forwarded immediately to the ground station. Other non-urgent fault indications will be logged in the remote gateway 6 which may generate an immediate alarm to the ground station if the arrival rate of these minor fault indications exceeds a threshold. The alarm severity and threshold values associated with this behaviour are configurable.

For aircraft applications, the craft-to-ground link is based on commercial satellite systems such as Inmarsat, Intelsat or terrestrial systems such as NATS or microwave. The different satellite systems vary greatly in bandwidth and quality. The in-craft satellite modules (Aircraft Earth Station or Mobile Earth Station) expose many different interfaces such as ARINC 746 used in aeronautical applications and conventional IP or Frame Relay used principally in the maritime industry.

The gateways 6 and 9 are able to handle these different interfaces and systems both in terms of the physical interfaces and protocols. Furthermore, the functional partition between the gateways 6 and 9 can be configured to optimise the use of the satellite link. GSM transcoding and rate adaptation (TRAU) can thus be performed either on board the craft by the gateway 6 or on the ground by gateway 9.

For example, in the case of Inmarsat Aero-H, transcoding is performed on the craft by gateway 6. This is because the Aero-H module which supports a CEPT E1 PCM link, compresses voice signals itself before sending over the satellite link.

In a typical maritime example, a transparent IP link is available between the gateways 6 and 9. In this scenario, the GSM encoded TRAU frames could be carried on the IP link using a streaming protocol such as RTP. Alternatively, if the GSM encoding is not efficient enough for the satellite link in question, transcoding can be performed by the gateway 6 which then uses a more efficient compression algorithm before transmitting to the satellite module.

The local maintenance terminal 23 of the remote gateway 6 supports functions used by field personnel including, but not limited to the following:
 Read fault information
 Read log files
 Download statistics
 Configure the BTS and gateway 6.
 Upload new software versions to the BTS and gateway 6.
 Test that the BTS and gateway 6 are operating correctly.

The LMT 23 is not necessary for normal operation of the BTS 5 or the gateways 6/9 which can be maintained remotely from the ground-based OMC.

The Local Control Panel 24 allows the crew to enable and disable the system and set the service. The Local Control Panel 24 also gives the crew system status and fault indications.

Signalling from the BTS 5 is carried in an optimised format over the satellite link. The BSC function in the central gateway 9 adapts this signalling to standard "A" interface format before sending to the MSC. The BSC function terminates unnecessary traffic from the MSC and simulates traffic from the BTS such as heartbeats that the MSC needs to receive.

To establish a connection to a remote gateway 6, the central gateway 9 must know the location and environment of the remote gateway 6 so that an appropriate communication channel can be established. This information is maintained in the database 32. This maintains a log of which remote gateways 6 are currently active and logged onto the system. This database also maintains a list of mobiles that are attached to each of its BTSs 5. This is to allow implicit deregistration of these mobiles when the BTS 5 and/or gateway 6 become unreachable. The subset of the database 32 that contains information pertaining to a particular gateway 6 is also stored in the subscriber database 25 on that gateway 6. This allows the gateway 6 to take subscriber data such as class of service into account when processing calls on the craft.

The O&M function 31 in the gateway 9 is responsible for the management of the gateway 9, the gateway 6, and the BTSs. It handles O&M data (faults, statistics, and configuration) exchanged with the airborne BTS and gateway 6 over the satellite link. The OMC uploads software and configuration data to the gateway 6 to allow on-line upgrades to the BTS 5 and the gateway 6. The O&M function 31 communicates with a conventional OMC 40 using SNMP and with the gateway OMC 33 using an appropriate protocol.

The following describes the operation of the communication system of the invention in more detail. It can be split into eight broad areas, namely
 BTS and Gateway Logon
 BTS and Gateway Logoff
 Location Update
 IMSI Detach
 Mobile Originated Voice Call
 Mobile Termninated Voice Call
 Mobile Originated SMS
 Mobile Terminated SMS
 Taking each in turn BTS and Gateway Logon Once the craft has reached an appropriate location, the in-craft system is started either automatically or manually by the crew. The gateway 6 checks that the craft-to-ground module is already logged on to the ground earth station and then sends a logon message to the gateway 9 containing its identity and authentication information.

The gateway 6 communicates with other on-board systems to determine operational parameters such as the location, altitude and state of the craft. This equipment includes but is not limited to the following:
 ARINC 429 bus or ARINC 746 ECL for location and altitude
 Various discrete signals for Weight On Wheels status, seatbelt status and door open status.
 GPS system for craft location.

The Local Control Panel

The gateway 9 updates the database 32 with the gateway 6 identity and data relevant to the communication channel. Contrary to the land based GSM network where BTS sites are "wired" to a particular BSC, in the invention different dynamically allocated communication channels may be used to connect a gateway 6 to a gateway 9. The gateway 9 must therefore keep track of the gateway's 6 location and communications environment.

The gateway 9 maintains associations between the craft's identity (for example an aircraft's AES id.) and location areas (LA) known to the MSC 10 in the database 32. The MSC 10 will page subscribers in a particular Location Area and the gateway 9 will use this association and its knowledge of subscribers registered on each remote gateway to locate the gateway 6 on the craft to forward the paging message to the correct BTS 5.

For example, Inmarsat uses four geostationary satellites to achieve near global coverage, only the Polar Regions not being covered. To communicate with an aircraft, the gateway 9 must know which of the four ocean regions the aircraft is flying in and therefore which satellite to use. The gateway 6 polls the SatCom module regularly to see if the satellite receiver has logged onto a new satellite. This happens when an aircraft hands over from one satellite to another. If the Ocean Region has changed, the gateway 6 initiates a new logon procedure (in this case the BTS is kept on-line so that mobiles are not required to re-register) and the gateway 9 updates the database 32 with the new area information. Alternatively, the gateway 9 may recognise that the craft has changed satellite and establish a link through the new satellite without the need for a logon procedure.

The gateway 9 will detect Ocean Region changes from the logon message. From the full address (e.g. X.25, E.164, Inmarsat number, IP, etc.) of the remote craft it builds the full correct dialled number (including the ocean region) that will be used to terminate voice calls to each subscriber. The dialled number is a combination of the ocean region, craft number and seat number. Each subscriber will be allocated a number for the flight duration. When the gateway 6 detects an incoming call on a particular number it will match that number to a subscriber to terminate the voice call.

BTS and Gateway Logoff

The gateway 6 may be shut down either automatically (e.g. when the craft approaches a specific geographical location) or manually by the crew. When this happens the gateway 6 sends a logoff message to the gateway 9 which updates the database 32 and sends a detach message to the MSC for all subscribers that were registered with the BTS.

Location Update

When a mobile on the craft loses signal from the ground PLMN it will scan for a new network and find the in-craft BTS's Broadcast Control Channel (BCCH). Once locked to this new BCCH the mobile recognises that it has changed location area (and PLMN) and so it will perform a location update procedure.

In another embodiment, specially customised mobile stations 12 will start to look for an "aircraft" network as soon as they are turned on in "aircraft" mode.

The mobile uses the Random Access Channel (RACH) to gain access to the BTS 5 and request a signalling channel.

The BTS forwards the request to the gateway 6 which responds with a channel assignment command to the BTS. The BTS in turn instructs the mobile to switch to the allocated channel.

Once the mobile has switched to the signalling channel, it sends a location update request to the BTS which forwards the request to the gateway 6. The gateway 6 sets up a connection to the gateway 9 (if one is not already established) and uses this connection to forward the request to the MSC.

The MSC responds by sending an authentication request to the mobile which is again relayed to the BTS and mobile across the gateways and data connection.

The mobile device processes the authentication request and sends the response back to the MSC. The MSC checks the response and if it is successful, updates the VLR and HLR.

The MSC then instructs the gateway 9 (BSC) to clear the call. The gateway 6 sends the clear command to the mobile. Once acknowledged by the mobile, the gateways 6 can tear down the data connection.

In another embodiment, Location Update requests from mobile devices are immediately acknowledged by the gateway 6. These requests are then buffered in the gateway 6 until a threshold of outstanding requests is exceeded or a timer expires, the requests are then batched and sent to the gateway 9. The gateway 9 then sends location update requests to the HLR and obtains authentication triplets from the HLR for each of the mobile stations. The triplets are batched and sent to the gateway 6 which will use these triplets to authenticate the mobile stations before they are allowed to initiate or receive service requests. This mechanism makes most efficient use of the signalling channel while ensuring that all mobile stations are correctly authenticated.

If, for whatever reason, the location update and/or authentication procedures fail, the registration request from the mobile will still be acknowledged. This ensures that the mobile remains camped on the on-board cell and its power can be controlled by the gateway 6. Service requests to and from these mobiles will be refused by the system until the location update and authentication procedures have been completed successfully.

Known subscribers may be included in different classes. The system may be configured to restrict access and service to certain classes of subscribers. For example, in a given configuration first and business class subscribers may be allowed to make and receive voice calls whereas economy passengers may only be allowed to send and receive SMS messages.

IMSI Detach

The IMSI detach procedure is initiated when the mobile is switched off. A detach message is sent over the satellite link to the ground based MSC. The MSC updates the subscriber's HLR so that new calls to the subscriber will be terminated in the home PLMN (typically diverted to voice mail) and will not use satellite resources unnecessarily.

If the ground station loses contact with the airborne gateway it will initiate an automatic detach procedure (implicit deregistration) after a configurable time for all the subscribers that had been logged on to the corresponding BTS.

Mobile Originated Voice Call

Once the mobile has registered successfully on the network it can make an outgoing call. The air interface used is standard GSM so the mobile sees no difference between the airborne BTS and a normal land BTS.

The mobile uses the Random Access Channel (RACH) to gain access to the BTS and request a signalling channel.

The BTS forwards the request to the gateway 6 which responds with a channel activation command to the BTS, the BTS activates a signalling channel (SDCCH). The gateway 6 now sends an Immediate Assignment Command to the BTS which is forwarded to the mobile on the Access Grant Channel (AGCH). The mobile switches to the SDCCH and sends a CM Service Request for a Mobile Originating call. The gateway 6 replies with an accept message and the mobile sends a Setup message which contains the dialled digits.

The gateway 6 uses these digits to build and send an ARINC 746 Setup message to the SatCom/NATS module. This Setup message is routed through the satellite network to the GES on the ground. The GES forwards the Setup request to the gateway 9, the gateway 9 uses the contents of the Setup message to build and send a standard A interface setup message to the MSC.

The MSC routes the call to the called subscriber.

The gateway 6 now instructs the BTS to activate a traffic channel (TCH). The gateway 6 sends an Immediate Assignment command through the BTS to the mobile which switches to the traffic channel. The gateway 6 instructs the BTS to release the signalling channel (SDCCH).

Once the called subscriber has been located by the PSTN, an alerting message is sent by the PSTN through the MSC, gateway 9, GES, and SatCom/NATS to the gateway 6.

The gateway 6 forwards this Alerting message through the BTS to the mobile. The user now hears ringing tone.

When the called subscriber picks up a Connect message is sent by the PSTN through the MSC, gateway 9, GES, and SatCom/NATS to the gateway 6.

The gateway 6 forwards this Connect message through the BTS to the mobile. The call is now established.

The gateway supports an external interface to the craft's In Flight Entertainment system or Public Address system. The gateway 6 recognises when the IFE or PA system needs to make a voice broadcast to passengers and superimposes the crew broadcast on the call's audio signal. This allows the crew to interrupt calls for important messages.

In another embodiment, if the gateway 6 recognises that the recipient is registered on the same craft the call may be switched locally in the gateway. This is to avoid using the craft-to-ground link bandwidth unnecessarily when both calling and called parties are logged onto the same gateway 6. This local switching function can be enabled or disabled per class of subscriber.

Mobile Terminated Voice Call

The MSC determines the location area of the called mobile and sends a paging message to the gateway 9 (BSC). The gateway 9 responds immediately to the MSC and the MSC sends a set-up request. In this case each location area is associated with one or more movable gateways 6. The gateway 9 queries the database 32 to find the ocean region and consequently the correct satellite to use for communications with the BTS.

The gateway 9 uses the set-up request from the MSC to build and send a set-up request to the mobile through the GES. This causes an ARINC 746 Setup request to be generated in the SatCom/NATS module and sent to the gateway 6.

The gateway 6 uses the information in the Setup message to build a Paging Command and send it to the BTS.

The BTS pages the mobile on the Paging Channel (PCH). The mobile responds with a Channel Required message on the Random Access channel (RACH).

The BTS forwards the Channel Required request to the gateway 6 which responds with a channel activation command to the BTS, the BTS activates a signalling channel (SDCCH). The gateway 6 now sends an Immediate Assignment Command to the BTS which is forwarded to the mobile on the Access Grant Channel (AGCH). The mobile switches to the SDCCH and sends a Paging Response through the BTS to the gateway 6.

The gateway 6 sends an ARINC 746 Call Proceeding message to the MSC through the satellite link, GES and gateway 9.

The gateway 6 sends a setup message through the BTS to the mobile which responds with a Call Confirmed message.

The gateway 6 now instructs the BTS to activate a traffic channel (TCH). The gateway 6 sends an Immediate Assignment command through the BTS to the mobile which switches to the traffic channel. The gateway 6 instructs the BTS to release the signalling channel (SDCCH).

The mobile starts ringing and sends an Alerting message to the gateway 6.

When the subscriber picks up a Connect message is sent through the BTS to the gateway 6, the gateway 6 uses this message to build an ARINC 746 Connect message which is sent to the SatCom/NATS module.

The gateway 9 relays this Connect to the MSC. The call is now established.

Mobile Originated SMS

Once the mobile has registered successfully on the network it can send an SMS message. The air interface used is standard GSM so the mobile sees no difference between the airborne BTS and a normal land BTS.

The mobile uses the Random Access Channel (RACH) to gain access to the BTS and request a signalling channel.

The BTS forwards the request to the gateway 6 which responds with a channel assignment command to the BTS. The BTS in turn instructs the mobile to switch to the allocated channel (SDCCH).

Once the mobile has switched to the signalling channel, it sends an SMS request to the BTS which forwards the request to the gateway 6. The gateway 6 sets up an X.25 circuit (if one is not already established) and uses this circuit to forward the request to the MSC.

The MSC forwards the SMS request to the subscriber's home SMSC which handles sending of the message to the recipient.

In another embodiment, if the gateway 6 recognises that the recipient is registered on the same craft the SMS message may be switched locally in the gateway. This is to avoid using the craft-to-ground link bandwidth unnecessarily when both the sender and the recipient are logged onto the same gateway 6.

Mobile Terminated SMS

The MSC determines the location area of the called mobile and sends a paging message to the gateway 9 (BSC). In this case each location area will have a single cell/BTS. The gateway 9 queries the Mobile Gateway Database to find the ocean region and consequently the correct satellite to use for communications with the BTS.

The gateway 9 sets up an X.25 circuit to the airborne gateway (if one is not already available) which is used to forward the paging message to the BTS. The BTS pages the mobile.

When the mobile detects the page it will immediately request a channel. The gateway 6 allocates a signalling channel to the mobile which sends a paging response to the MSC on this channel.

The MSC now sends the SMS to the recipient mobile through the gateway 9, X.25 satellite link, gateway 6 and BTS respectively.

The gateway 6 can send SMS messages to any mobile station registered on the craft. This facility is typically used to broadcast information such as welcome messages to all registered users. These messages can be sent automatically or when requested by the crew. Delivery of these internal SMS messages and intra-craft SMS messages do not require any craft-to ground communication.

The existing conventional Pico BTS's available on the market today constitute practical small and economically viable elements for Airborne GSM solutions. However the BSC network element alternatives available on the market do not meet the strict constraints of this particular market segment. If a product was to come to market that would satisfy such, the overall network architecture of a ground based MSC communicating to thousands of individual BSS's would not be viable. There are several significant technical constraints for such BTS only and BSS only, on an aircraft.

The Distributed BSC Architecture, consisting of ground based Gateways each supporting one or many on-board Movable Gateways, supports standard GSM A and A-bis interfaces. This allows the use of standard off-the-shelf unmodified BTS and NSS components which significantly reduces the cost of the system. Furthermore, the one-to-many relationship between Fixed Gateway and Movable Gateways minimizes the number of expensive signalling links needed in the NSS for a given mobile population which reduces the cost even more.

Efficient use of satellite bandwidth is achieved through the Call handling Model and Signalling Encoding Scheme.

The call model can make use of raw satellite bandwidth or can piggy-back on top of existing ISDN. (Q.931) based systems whichever is most appropriate; this allows existing satellite equipment to be used in a most cost effective method. Data streams carrying voice traffic are compressed to ensure optimal cost to quality ratios.

The signalling encoding and handling scheme ensures that the system uses the least possible satellite bandwidth while supporting all necessary signalling for compatibility with PLMN requirements such as mobile authentication. All unnecessary signalling is terminated at the central gateway 9 and remote gateway 6 so that only revenue-generating call related signalling and essential mobility management signalling occupy satellite bandwidth. In the absence of call traffic and mobility management traffic, no satellite bandwidth is being used.

In other embodiments, the BTS could support other radio protocols including but not limited to the following:

CDMA (IS95) and evolutions of CDMA (CDMA 2000, CDMA 20001X etc)

UMTS and evolutions of UMTS

Evolutions of GSM such as GPRS, HSCSD, EDGE

TDMA

TD-SCDMA

Wireless LAN, RFC 802.11

Bluetooth

In another example the craft-to-ground communications systems could use other satellite or terrestrial based systems such as NATS, TFTS, Microwave, Intelsat, Globalstar, Iridium, ICO, Connexion by Boeing or other Inmarsat systems. Also, the remote parts may alternatively be located in a fixed location, for example providing a small GSM facility at a remote fixed location such as a remote village or regions generally where there is poor mobile network infrastructure. While the invention as described splits a BSC into two gateways, it may instead split an equivalent mobile network node such as an RNC for a 3G network, or a PCU for GPRS network.

In another aspect, specially customised mobile stations may be used at the remote end. This customised mobile is intended for use in aircraft where there a risk or perceived risk of interfering with on-board avionics equipment. This customised mobile station supports the following features in addition to standard GSM features:

- The mobile station has an external switch and indicator used to put the mobile in "aircraft" mode. The switch position and indicator are clearly visible externally so that they may be checked by crew members.
- When in "aircraft" mode, the mobile station will automatically limit its output power to a pre-defined value, typically of the order of 20 mW.
- When in "aircraft" mode, the mobile station will only log on to "aircraft" networks. The type of network (normal or "aircraft") is indicated in the Broadcast Control Channel (BCCH) of the airborne BTS. For emergency calls, the mobile station may log onto any BTS.
- When in "aircraft" mode, the mobile station will accept Over The Air (OTA) setting of ring and alert tones to silent mode using SMS. This is to minimise disturbance to other passengers.

The BTS 5 and the gateway 6 are able to handle both conventional mobile stations and customised mobiles as described above.

The invention is not limited to the embodiments described but may be varied in construction and detail.

The invention claimed is:

1. A mobile network base station controller split into two physically separated parts, said parts being a central gateway and a physically separate remote gateway, in which:
   the remote gateway and the central gateway together constitute a base station controller for a remote cell of the mobile network, the remote gateway being physically located in the remote cell,
   the remote gateway communicates with cell equipment including a base transceiver station in said remote cell via a standard protocol for said remote mobile network cell,
   the central gateway communicates via a standard protocol with a mobile network switching node, and
   the gateways perform internal base station controller communication between each other using a remote communication link such that the two gateways together constitute said base station controller;
   wherein the gateways use compression for at least some internal communication on the remote link.

2. The mobile network base station controller as claimed in claim 1, wherein the remote communication link is a satellite link.

3. The mobile network base station controller as claimed in claim 1, wherein the remote communication link is a satellite link; and wherein the remote communication link is a craft-to-ground communication link.

4. The mobile network base station controller as claimed in claim 1, wherein the remote communication link is terrestrial based radio, microwave, cable or optical fibre.

5. The mobile network base station controller as claimed in claim 1, wherein each gateway buffers speech packets and combines a plurality of buffered speech packets into a single transmission packet.

6. The mobile network base station controller as claimed in claim 1, wherein each gateway buffers speech packets and combines a plurality of buffered speech packets into a single transmission packet; and wherein the transmission packet is an RTP packet.

7. The mobile network base station controller as claimed in claim 1, wherein the gateways perform transcoding and rate adaptation at the most appropriate gateway according to the nature of the remote link.

8. The mobile network base station controller as claimed in claim 1, wherein the central gateway comprises an operations and maintenance function for both gateways.

9. The mobile network base station controller as claimed in claim 1, wherein the remote gateway comprises an operations and maintenance function for itself and the remote mobile network cell.

10. The mobile network base station controller as claimed in claim 1, wherein the central gateway comprises an operations and maintenance function for both gateways; and wherein the operations and maintenance function downloads updates to the remote gateway.

11. The mobile network base station controller as claimed in claim 1, wherein the central gateway comprises an operations and maintenance function for both gateways; and wherein the operations and maintenance function uploads fault information, status information and statistics from the remote gateway.

12. The mobile network base station controller as claimed in claim 1, wherein the central gateway maintains a database of data pertaining to remote gateways with which it communicates.

13. The mobile network base station controller as claimed in claim 1, wherein the remote gateway is linked to an entertainment or public announcement system.

14. The mobile network base station controller as claimed in claim 13, wherein the remote gateway allows calls to be interrupted by the public announcement or entertainment system.

15. The mobile network base station controller as claimed in claim 1, wherein the remote gateway determines if a locally-initiated call or message is to a person located in its cell, and avoids use of the remote link if this is the case.

16. The mobile network base station controller as claimed in claim 1, wherein the central gateway detects Ocean Region changes from a remote gateway logon message and from the full address of the remote craft, builds a full correct dialled number including the Ocean region that will be used to terminate voice calls to each subscriber.

17. The mobile network base station controller as claimed in claim 1, wherein the central gateway automatically generates a response to an MSC class mark enquiry.

18. The mobile network cell comprising a base station controller as claimed in claim 1, and a base station transceiver.

19. The method of communication between a remote mobile network cell and a central mobile network node, the method comprising a base station transceiver of the remote cell communicating with a remote gateway of a base station controller of claim 1, the remote gateway processing signals received from the transceiver and transmitting internal base station controller signals to the central gateway via a remote link.

20. A mobile network base station controller split into two physically separate parts, said parts being a central gateway and a physically separate remote gateway, in which:
- the remote gateway and the central gateway together constitute a base station controller for a remote cell of the mobile network, the remote gateway being physically located in the remote cell,
- the remote gateway communicates with cell equipment including a base transceiver station in said remote cell via a standard protocol for said remote mobile network cell,
- the central gateway communicates via a standard protocol with a mobile network switching node,
- the gateways perform internal base station controller communication between each other using a remote communication link such that the two gateways together constitute said base station controller;
- wherein the gateways perform transcoding and rate adaptation at the most appropriate gateway according to the nature of the remote link.

21. A mobile network base station controller split into two physically separated parts, said parts being a central gateway and a physically separate remote gateway, in which:
- the remote gateway and the central gateway together constitute a base station controller for a remote cell of the mobile network, the remote gateway being physically located in the remote cell,
- the remote gateway communicates with cell equipment including a base transceiver station in said remote cell via a standard protocol for said remote mobile network cell,
- the central gateway communicates via a standard protocol with a mobile network switching node, and
- the gateways perform internal base station controller communication between each other using a remote communication link such that the two gateways together constitute said base station controller;
- wherein the gateways use compression for at least some internal communication on the remote link;
- wherein the remote gateway terminates radio measurement signalling and link measurement signalling; and
- wherein the central gateway terminates link management signalling and "heartbeat" signalling from a mobile network node.

22. A mobile network base station controller split into two physically separated parts, said parts being a central gateway and a physically separate remote gateway, in which:
- the remote gateway and the central gateway together constitute a base station controller for a remote cell of the mobile network, the remote gateway being physically located in the remote cell,
- the remote gateway communicates with cell equipment including a base transceiver station in said remote cell via a standard protocol for said remote mobile network cell,
- the central gateway communicates via a standard protocol with a mobile network switching node, and
- the gateways perform internal base station controller communication between each other using a remote communication link such that the two gateways together constitute said base station controller;
- wherein the gateways use compression for at least some internal communication on the remote link, and
- wherein at least one gateway terminates some signalling received from an external entity to minimize internal traffic on the remote communication link.

23. The mobile network base station controller as claimed in claim 22, wherein the remote gateway terminates "heartbeat" signalling from remote network nodes.

24. The mobile network base station controller as claimed in claim 22, wherein the remote gateway terminates radio measurement signalling.

25. The mobile network base station controller as claimed in claim 22, wherein the remote gateway terminates link measurement signalling.

26. The mobile network base station controller as claimed in claim 22, wherein the central gateway terminates link management signalling.

27. The mobile network base station controller as claimed in claim 22, wherein the central gateway terminates "heartbeat" signalling from a mobile network node.

* * * * *